United States Patent
Caraccio et al.

(10) Patent No.: US 12,511,208 B2
(45) Date of Patent: Dec. 30, 2025

(54) HOST CONTROLLED ELECTRONIC DEVICE TESTING

(71) Applicant: Micron Technology, Inc., Boise, ID (US)

(72) Inventors: Danilo Caraccio, Milan (IT); Daniele Balluchi, Cernusco Sul Naviglio (IT); Niccolò Izzo, Vignate (IT); Alessandro Orlando, Milan (IT)

(73) Assignee: Micron Technology, Inc., Boise, ID (US)

( * ) Notice: Subject to any disclaimer, the term of this patent is extended or adjusted under 35 U.S.C. 154(b) by 72 days.

(21) Appl. No.: 18/121,312

(22) Filed: Mar. 14, 2023

(65) Prior Publication Data

US 2023/0289270 A1 Sep. 14, 2023

Related U.S. Application Data

(60) Provisional application No. 63/319,634, filed on Mar. 14, 2022.

(51) Int. Cl.
*G06F 11/20* (2006.01)
*G06F 11/22* (2006.01)
*G06F 11/263* (2006.01)
*G06F 11/273* (2006.01)

(52) U.S. Cl.
CPC ........ *G06F 11/263* (2013.01); *G06F 11/2221* (2013.01); *G06F 11/273* (2013.01)

(58) Field of Classification Search
CPC .... G06F 11/263; G06F 11/273; G06F 11/221; G06F 11/22; G06F 11/26; G06F 11/27
See application file for complete search history.

(56) References Cited

U.S. PATENT DOCUMENTS

| | | | | |
|---|---|---|---|---|
| 3,496,543 | A | * | 2/1970 | Greenly ............ H04N 1/00328 382/176 |
| 7,356,432 | B1 | * | 4/2008 | Lang .................... G06F 11/263 702/117 |
| 10,691,570 | B1 | * | 6/2020 | Lui ......................... G06F 11/27 |
| 2003/0097650 | A1 | * | 5/2003 | Bahrs .................. G06F 11/3688 717/124 |
| 2005/0081166 | A1 | * | 4/2005 | Stokke ...................... G06F 8/60 715/851 |
| 2012/0153982 | A1 | * | 6/2012 | Lee .................. G01R 31/31908 324/756.07 |
| 2021/0117246 | A1 | * | 4/2021 | Lal .......................... G06F 21/53 |
| 2022/0358988 | A1 | * | 11/2022 | Badrieh ............. G11C 11/2297 |
| 2023/0395173 | A1 | * | 12/2023 | Schaefer ................ G11C 29/42 |

* cited by examiner

*Primary Examiner* — Philip Guyton
*Assistant Examiner* — Sean Kevin Mcnamara
(74) *Attorney, Agent, or Firm* — Brooks, Cameron & Huebsch, PLLC

(57) ABSTRACT

An electronic device can be configured to enable a host to indirectly control testing associated with the electronic device. The interface between the host and the electronic device can be abstract, such that the host does not have direct control over the electronic device. Examples of the electronic device include a memory device and a power management integrated circuit. The electronic device can allow the host to discover a quantity of tests supported by the electronic device and corresponding test descriptors. The electronic device can interact with the host to configure tests and/or reporting of test results.

21 Claims, 10 Drawing Sheets

| Byte Offset | Length | Description |
|---|---|---|
| 00h | 1 | Maximum Maintenance Operation Latency. This field is defined for all Maintenance Operation Features. For Media Test Capability Feature this field shall be set with all zeros |
| 01h | 2 | Operation Capabilities. This field is defined for all Maintenance Operation Features. For Media Test Capability Feature this field shall be set with all zeros |
| 03h | 9 | Operation Mode. This field is defined for all Maintenance Operation Features. For Media Test Capability Feature this field shall be set with all zeros |
| 0Ch | 1 | Maintenance Operation Class. It shall be set to 02h (Testing) |
| 0Dh | 1 | Maintenance Operation Subclass. It shall be set to 00h (Media Test) |
| 0Eh | 2 | Reserved |
| 10h | 1 | Number of Supported Tests. Total number of tests supported by the device |
| 11h | 15 | Reserved |

| | | |
|---|---|---|
| 20h | 2 | Test ID. Unique ID to identify the Test. Test ID shall be used to reference the test to be executed in the Media Test Configuration Feature. |
| 22h | 1 | Algorithm. Media test algorithm supported<br>00h: Reserved<br>01h: Write pattern<br>02h: Write, Read and Compare pattern<br>03h: Read pattern<br>04h: Checkerboard<br>05h: MARCH<br>06h: MATS<br>07h: MATS+<br>08h: Walking 1s<br>09h: Walking 0s<br>Others: reserved |
| 23h | 1 | Execution Time. Maximum test execution time per GB.<br>Bit [7:4] These bits specify the maximum operation latency with the time scale indicated in bit[3:0].<br>Bit [3:0] These bits specify the time scale (0000b: 1 us, 0001b: 10 us, 0010b: 100 us, 0011b: 1 ms, 0100b: 10 ms, 0101b: 100 ms, 0110b: 1 s, 0111b: 10 s) |
| 24h | 2 | Flags<br>Bit[0]: Address Configurable flag. If set the address range is configurable<br>Bit[1]: Inverse pattern support. If set the test can be repeated complementing the selected patted<br>Bit[2]: Exit on first UE. The test can be stopped on the first UE.<br>Bit[3]: Error count threshold settable<br>Bit[7:4]: Addressing mode (Bit[4]: Ascending, Bit[5]: Descending, Bit[6]: Algorithm Specific, Bit[7]: Random)<br>Bit[15:10]: reserved |
| 26h | 2 | Supported Patterns. Bit map to advertise supported 64B patterns<br>Bit[0]: user provided<br>Bit[1]: vendor specific<br>Bit[2]: PRBS<br>Bit[3]: DPA[63:0]<br>Others: reserved |
| 28h | 1 | PRBS Length. Length of the PRBS sequence calculated as 2PRBS Length -1. Max value is 32. This field is valid if PRBS pattern is supported |
| 29h | 1 | Output Mode. Supported output mode:<br>Bit[0]: short output log<br>Bit[0]: long output log<br>Bit[7:2]: reserved |
| 2Ah | 3 | Error Log Size. The maximum number of errors that can be reported for all the tests configured by the host. If the total number of errors occurred during the execution of the configured tests overflows, it will be signaled in the output log |
| 2D | 3 | Reserved |

| Byte Offset | Length | Description |
|---|---|---|
| 00h | 1 | Maximum Maintenance Operation Latency. This field is defined for all Maintenance Operation Features. For Media Test Configuration Feature this field shall be set with all zeros |
| 01h | 2 | Operation Capabilities. This field is defined for all Maintenance Operation Features. For Media Test Configuration Feature this field shall be set with all zeros |
| 03h | 9 | Operation Mode. This field is defined for all Maintenance Operation Features. For Media Test Configuration Feature this field shall be set with all zeros |
| 0Ch | 1 | Maintenance Operation Class. It shall be set to 02h (Testing) |
| 0Dh | 1 | Maintenance Operation Subclass. It shall be set to 00h (Media Test) |
| 0Eh | 2 | Reserved |
| 10h | 2 | Number of iterations. Number of repetitions of the entire test. |
| 12h | 1 | Host Configured Max Execution Time. Total time provided by the host to execute the test.<br>Bit [7:4] These bits specify the maximum operation latency with the time scale indicated in bit[3:0].<br>Value zero indicates that the test is not time-based<br>Bit [3:0] These bits specify the time scale (0000b: 1 us, 0001b: 10 us, 0010b: 100 us, 0011b: 1 ms, 0100b: 10 ms, 0101b: 100 ms, 0110b: 1 s, 0111b: 10 s) |
| 13h | 1 | Device Estimated Execution Time. Total time estimated by the device to execute the entire test required by the host. This parameter can be read after the host has successfully configured the test. |
| 14h | 8 | Start Address. Start DPA of the test. It shall be set to 0 is the entire address range has to be tested. |
| 1Ch | 8 | Length. The range of physical addresses to test. This length shall be in units of 64 bytes. All zeros value means that the entire address range shall be tested |
| 24h | 1 | Number of Tests. Total number of tests configured by the host |
| 25h | 1 | Output Log Configuration. Options that can be selected to configure the test output log<br>Bit[0]: Short Output Log is reported<br>Bit[1]: Long Output Log is reported<br>Bit[3]: Complete. All the error signatures are reported. This option can be configured if long output log is selected (Bit[1] is set)<br>Bit[4]: Single error signature. If error count threshold is set, only the signature of the first error after the threshold is exceeded is reported. If error count threshold is not set, only the signature of the first error encountered is reported. This option can be configured if long output log is selected (Bit[1] is set) |
| 26h | 10 | Reserved |

Fig. 5A

| Byte Offset | Length | Description |
|---|---|---|
| 30h | 2 | Test ID. This field identifies the Test |
| 32h | 1 | Flags<br>Bit[0]: Inverse pattern enable. If set the is repeated complementing the selected patted<br>Bit[1]: Exit on UE. The test is stopped on the first UE. If Bit[2] is set, the test will stop on the first UE after exceeding the threshold.<br>Bit[2]: Error count threshold enable<br>Bit[3]: Reserved<br>Bit[7:4]: Addressing mode (Bit[4]: Ascending, Bit[5]: Descending, Bit[6]: Algorithm Specific, Bit[7]: Random)<br>Bit[15:8]: reserved |
| 33h | 2 | Pattern type. Selected 64B patterns (a single bit must be set)<br>Bit[0]: User provided<br>Bit[1]: Vendor specific<br>Bit[2]: PRBS<br>Bit[3]: DPA[63:0] |
| 35h | 1 | Pattern value. Pattern value provided by the user, if Pattern type Bit[9] is set.<br>If the value User Provided for Pattern type is not selected, this field shall be all set to 0. |
| 35h | 2 | Vendor Specific. This field is set if Pattern Type field selectable Bit[10] is set. |
| 36h | 4 | PRBS Seed. User provided PRBS Seed. This field is valid if Pattern type selected is PRBS |
| 3Ch | 2 | Error Count Threshold. User programmable error count threshold. Error tracking starts after exceeding the Error Count Threshold. |
| 3E | 18 | Reserved |

| Description |
|---|
| Number of Tests Executed. Number of Test executed and whose results are available |
| Test ID |
| Start Time. Expressed as timestamp, it represents the number of unsigned nanoseconds that have elapsed since midnight, 01-Jan-1970, UTC. |
| End Time. Expressed as timestamp, it represents the number of unsigned nanoseconds that have elapsed since midnight, 01-Jan-1970, UTC. |
| Status<br>• Bit[0]: completed with success<br>• Bit[1]: completed with failure<br>• Bit[2]: aborted by the host with success<br>• Bit[3]: aborted by the host with failure<br>• Bit[4]: aborted by the device with success<br>• Bit[5]: aborted by the device with failure<br>• Bit[6]: exceeded Host Configured Max Execution Time<br>• Bit[7]: error log overflow<br>• Bit[15:8]: reserved |

Fig. 6A

| | |
|---|---|
| Capacity tested. This field indicates the capacity tested of the device. Expressed in multiples of 256 MB. | |
| Uncorrectable Error Count. The total number of uncorrectable memory errors the device has detected during the test configured by the host. | |
| Correctable Error Count. The total number of correctable memory errors the device has detected during the test configured by the host. | |
| Physical Address: The physical address where the error occurred during the test execution<br>• Bit[0]: Volatile. When set, indicates the DPA field is in the volatile memory range. When cleared, indicates the DPA is in the persistent memory range<br>• Bit[5:1]: Reserved<br>• Bit[63:6]: DPA | |
| Validity Flags: Indicators of what fields are valid in the returned data<br>• Bit[0]: When set, the Channel field is valid<br>• Bit[1]: When set, the Rank field is valid<br>• Bit[2]: When set, the Nibble Mask field is valid<br>• Bit[3]: When set, the Bank Group field is valid<br>• Bit[4]: When set, the Bank field is valid<br>• Bit[5]: When set, the Row field is valid<br>• Bit[6]: When set, the Column field is valid<br>• Bit[7]: When set, the Correction Mask field is valid<br>• Bits[15:8]: Reserved | |
| Channel: The channel of the memory error location. A channel is defined as an interface that can be independently accessed for a transaction. The CXL device may support one or more channels. | |
| Rank: The rank of the memory error location. A rank is defined as a set of memory devices on a channel that together execute a transaction. Multiple ranks may share a channel. | |
| Nibble Mask: Identifies one or more nibbles in error on the memory bus producing the event. Nibble Mask bit 0 shall be set if nibble 0 on the memory bus produced the event, etc. This field should be valid for corrected memory errors. See the example below on how this field is intended to be used. | |
| Bank Group: The bank group of the memory error location | |
| Bank: The bank number of the memory error location | |
| Row: The row number of the memory error location | |
| Column: The column number of the memory error location | |
| Correction Mask: Identifies the bits in error within that nibble in error on the memory bus producing the error. The lowest nibble in error in the Nibble Mask uses Correction Mask 0, the next lowest nibble uses Correction Mask 1, etc. Burst position 0 uses Correction Mask nibble 0, etc. Four correction masks allow for up to 4 nibbles in error. This field should be valid for corrected memory errors. See the example below on how this field is intended to be used.<br>Offset 49h: Correction Mask 0 (8 bytes)<br>Offset 51h: Correction Mask 1 (8 bytes)<br>Offset 59h: Correction Mask 2 (8 bytes)<br>Offset 61h: Correction Mask 3 (8 bytes) | |
| Reserved | |

Fig. 6B

HOST CONTROLLED ELECTRONIC DEVICE TESTING

CROSS-REFERENCE TO RELATED APPLICATIONS

This application claims priority to U.S. Provisional Application 63/319,634, filed Mar. 14, 2022, which is incorporated by reference.

TECHNICAL FIELD

The present disclosure relates generally to semiconductor memory and methods, and more particularly, to apparatuses, systems, and methods for host controlled electronic device testing.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, ferroelectric random access memory (FeRAM), and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system. A controller may be used to manage the transfer of data, commands, and/or instructions between the host and the memory devices.

BRIEF DESCRIPTION OF THE DRAWINGS

FIG. 4A is a table illustrating a common test capability header of a response to a first command in accordance with a number of embodiments of the present disclosure.

FIG. 4B is a table illustrating a test descriptor of a response to a first command in accordance with a number of embodiments of the present disclosure.

FIG. 5A is a table illustrating a common test configuration header associated with a second command in accordance with a number of embodiments of the present disclosure.

FIG. 5B is a table illustrating a test configuration associated with a second command in accordance with a number of embodiments of the present disclosure.

FIG. 6A is a table illustrating a short output log in accordance with a number of embodiments of the present disclosure.

FIG. 6B is a table illustrating additional output log information for a long output log in accordance with a number of embodiments of the present disclosure.

DETAILED DESCRIPTION

Figure 1:
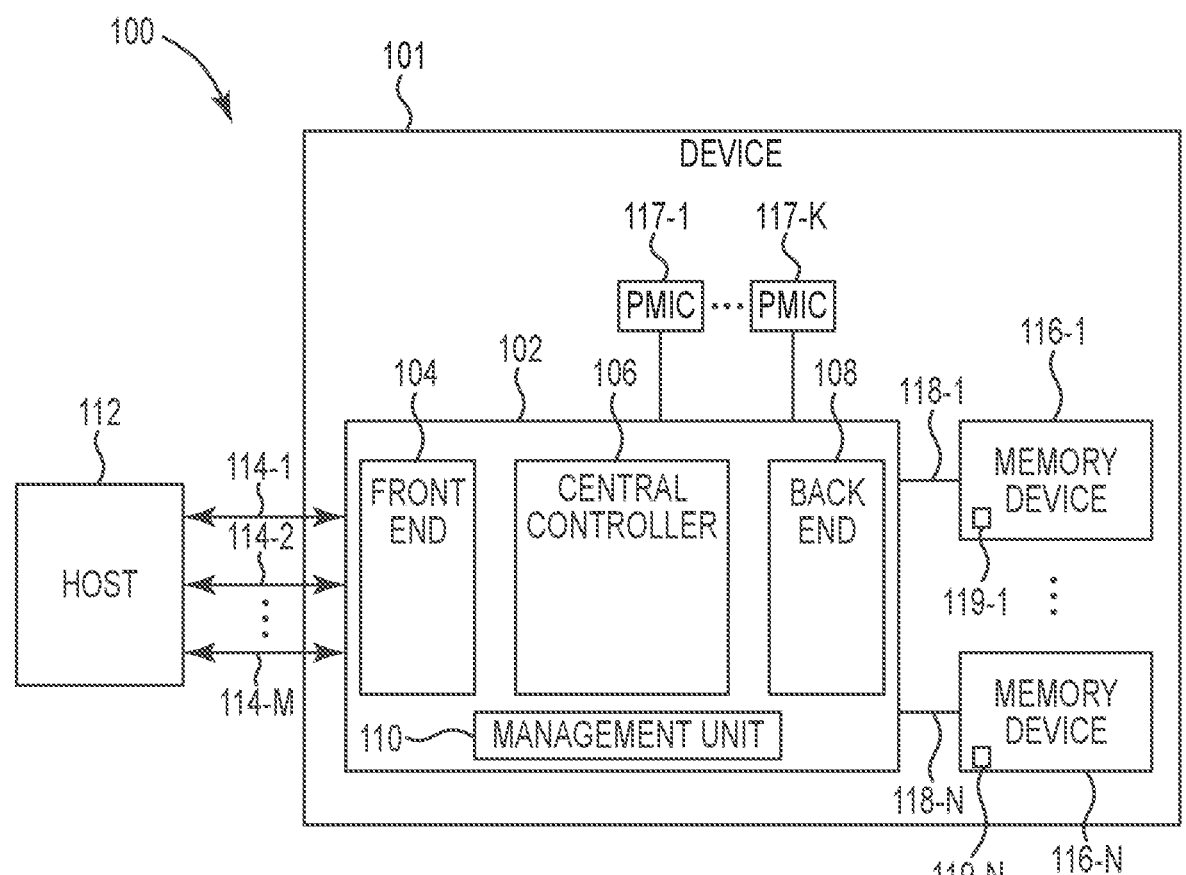
FIG. 1 is a block diagram of a computing system in accordance with a number of embodiments of the present disclosure.

Systems, apparatuses, and methods related to host controlled electronic device testing. In some previous approaches, electronic device testing, such as memory media testing or power management integrated circuit (PMIC) testing can be performed during system manufacturing or during the time after a computing system is powered on but before the operating system (OS) boots up. For example, a host having direct access to a PMIC or system memory (e.g., DRAM) could use a basic input/output system (BIOS) or other firmware to perform media tests of the electronic device, such as a power on self test (POST). As another example, a central processing unit (CPU) having direct access to the electronic device can cause the electronic device to be tested. However, some emerging memory systems are not so closely coupled to the host to allow for such control. For example, different memory types may be connected to the host via an abstracted interface that does not provide for direct host control over the memory. A desire exists to provide the ability for the host to test such memory systems.

Aspects of the present disclosure address the above and other challenges. For example, an electronic device (e.g., a memory device or PMIC) can be configured to enable a host to control testing associated with the electronic device. The interface between the host and the electronic device can be abstract, such that the host does not have direct control over the electronic device. Instead, the electronic device can provide translation between a host protocol, such as compute express link (CXL), and an electronic device protocol, such as a memory protocol (e.g., a protocol to control a dual data rate (DDR) memory interface). The electronic device can enable test capability discovery, configuration, and/or control for the host. The controller can enable test result reporting from the electronic device to the host.

Such tests can help determine signal integrity on buses of the electronic device devices, bit error rates (BER), or other potential issues that could warrant replacement of the electronic device without interrupting the overall system making use of the electronic device. One example of such a test is a marching test, which can be used to detect data retention faults (e.g., bit flips), address faults (e.g., a defect in an address decoder), and neighborhood pattern sensitive faults (e.g., errors caused by the close physical proximity of memory components, such as charge sharing), among others. A marching test includes a finite sequence of march elements (read and/or write operations applied to memory cells in increasing or decreasing address order). One example of a marching test is a MATS+ marching test.

CXL is a high-speed central processing unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost. CXL is designed to be an industry open standard interface for high-speed communications, as accelerators are increasingly used to complement CPUs in support of emerging applications such as artificial intelligence and machine learning. CXL technology is built on the PCIe infrastructure, leveraging PCIe physical and electrical interfaces to provide advanced protocol in areas such as input/output (I/O) protocol, memory protocol (e.g., initially allowing a host to share memory with an accelerator), and coherency interface.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. For example, 112 may reference element "12" in FIG. 1, and a similar element may be referenced as 212 in FIG. 2. Analogous elements within a Figure may be referenced with a hyphen and extra numeral or letter. See, for example, elements 116-1, ..., 116-N in FIG. 1. Such analogous elements may be generally referenced without the hyphen and extra numeral or letter. For example, elements 116-1, ..., 116-N may be collectively referenced as 116. As used herein, the designators "M", "N", and "T", particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 is a block diagram of a computing system 100 in accordance with a number of embodiments of the present disclosure. The computing system 100 can include a controller 102 having a front end portion 104, a central controller portion 106, a back end portion 108, and a management unit 110. The computing system 100 can include a host 112 and electronic devices (e.g., CXL device 101, memory devices 116-1, ..., 116-N, PMICs 117-1, ..., 117-K and/or PMICs 119-1, ..., 119-N) coupled to the controller 102.

The front end portion 104 includes a host interface and interface management circuitry to couple the controller 102 to the host 112 through the input/output (I/O) lanes 114-1, 114-2, ..., 114-M and circuitry to manage the I/O lanes 114. There can be any quantity of I/O lanes 114, such as eight, sixteen, or another quantity of I/O lanes 114. In some embodiments, the I/O lanes 114 can be configured as a single port. In at least one embodiment, the interface between the controller 102 and the host 112 can be a PCIe physical and electrical interface operated according to a CXL protocol.

The central controller portion 106 can include and/or be referred to as data management circuitry. The central controller portion 106 can control, in response to receiving a request from the host 112, performance of a memory operation. Examples of the memory operation include a read operation to read data from a memory device 116 or a write operation to write data to a memory device 116. An example of the memory devices 116 is DRAM operated according to a protocol such as low-power double data rate (LPDDRx), which may be referred to herein as LPDDRx DRAM devices, LPDDRx memory, etc. The "x" in LPDDRx refers to any of a number of generations of the protocol (e.g., LPDDR5). Although not specifically illustrated, the memory devices 116 each include at least one array of memory cells and can include a local controller for the memory arrays located thereon. In addition to data, the memory devices 116 can store information regarding common test capabilities, and/or test descriptors for the various tests that the memory device 116 supports (is capable of performing). Within the context of a memory device 116, such tests can be media tests. As used herein "media" refers to portions of the data path for the memory devices 116, such as the memory cells, buses, etc.

The memory devices 116 can include respective PMICs 119 and/or be coupled to respective PMICs 117. A PMIC 119 can provide local voltage regulation to the memory device 116. A PMIC 117 can provide power supply voltages to more than one or all memory devices 116. The memory devices 116 may have voltage regulators separate from the PMICs 117, 119. Although multiple PMICs 117-1, ..., 117-K are illustrated, in some embodiments, the computing system 100 may include only one PMIC 117. The PMICs 117, 119 may be referred to as a smart voltage regulation system for the memory device 116. The PMIC 119 can enable configuration of voltage ramps and levels (e.g., for sensing memory cells) and/or current monitoring. The PMIC 116 can apply configured voltages to memory cells of a memory array on the memory device 116. The PMIC relives a host 112 and/or controller 102 from providing power management functionality for the memory device 116. The PMIC 119 can provide functionality such as threshold protection, error injection capabilities, programmable power on sequence, and power management features. The PMIC 119 allows for better power regulation and reduced complexity versus implementing such functionality on a host 112 and/or controller 102. The PMIC 119 can be configured to output one or more signals for various operations performed by the memory device 116. The signals to be output by the PMIC 119 can be determined based on conversion of a PMIC supply voltage to one or more reduced voltages corresponding to voltages compatible with operation of one or more components of the memory device 116, such as a local controller, memory array, and/or circuitry associated therewith, such as control circuitry, input/output (I/O) circuitry, address circuitry, etc.

The central controller portion 106 can generate error detection information and/or error correction information based on data received from the host 112. The central controller portion 106 can perform error detection operations and/or error correction operations on data received from the host 112 or from the memory devices 116. An example of an error detection operation is a cyclic redundancy check (CRC) operation. CRC may be referred to as algebraic error detection. CRC can include the use of a check value resulting from an algebraic calculation using the data to be protected. CRC can detect accidental changes to data by comparing a check value stored in association with the data to the check value calculated based on the data. An example of an error correction operation is an error correction code (ECC) operation. ECC encoding refers to encoding data by adding redundant bits to the data. ECC decoding refers to examining the ECC encoded data to check for any errors in the data. In general, the ECC can not only detect the error but also can correct a subset of the errors it is able to detect.

The back end portion 108 can include a media controller and a physical (PHY) layer that couples the controller 102 to the memory devices 116. As used herein, the term "PHY layer" generally refers to the physical layer in the Open Systems Interconnection (OSI) model of a computing system. The PHY layer may be the first (e.g., lowest) layer of the OSI model and can be used transfer data over a physical data transmission medium. In some embodiments, the physical data transmission medium can include channels 118-1, . . . , 118-N. The back end portion 108 incudes an electronic device (e.g., memory) interface coupled to the channels 118 to exchange (e.g., transmit or receive) data, commands, instructions, etc. with the memory devices 116. In some embodiments, the memory device 116 can have a first memory interface with the controller 102 for memory operations and a second interface with the controller 102 for PMIC 119 operations. In some embodiments, the memory device 116 has a single interface with the memory controller 102, but different channels or other physical connections, such as channels 118, for memory operations and PMIC operations.

In some embodiments, the controller 102 can include a management unit 110 to initialize, configure, and/or monitor characteristics of the controller 102. The management unit 110 can include an I/O bus to manage out-of-band data and/or commands, a management unit controller to execute instructions associated with initializing, configuring, and/or monitoring the characteristics of the controller, and a management unit memory to store data associated with initializing, configuring, and/or monitoring the characteristics of the controller 102. As used herein, the term "out-of-band" generally refers to a transmission medium that is different from a primary transmission medium of a network. For example, out-of-band data and/or commands can be data and/or commands transferred to a network using a different transmission medium than the transmission medium used to transfer data within the network.

In some embodiments, the controller 102 can translate communications between the host 112 and the memory devices 116. For example, the controller 102 can translate communications received via the host interface from a first protocol to a second protocol and translate communications received from the memory interface from the second protocol to the first protocol. In some embodiments, the controller 102 can use CXL protocols to manage the host interface, which may be configured electrically and physically as a PCIe interface.

The controller 102 can receive a first command from the host 112 via a host interface. The host 112 can use the first command to discover test capabilities of the electronic device (e.g., the electronic device 101). In response to the first command, the controller 102 can query the electronic device. In particular the management unit 110 can execute firmware to process requests received from the host 112 and manage/perform the tests. The controller 102 can receive signals indicative of a quantity of tests supported by an electronic device and a corresponding test descriptor for each test via the memory interface and transmit signals indicative of the quantity of tests and corresponding test descriptors via the host interface as a response to the first command. The electronic device can be a memory device 116 or a PMIC 119, not to the exclusion of other electronic devices. The quantity of tests is a number representing how many different tests the electronic device is capable of performing. Examples of the corresponding test descriptors (for each of the quantity of tests) include a test identifier, algorithm, execution time, flags, supported patterns, pseudo-random binary sequence (PRBS) length, output mode, and error log size. The test descriptors are described in more detail with respect to FIG. 4B. The controller 102 can thereby advantageously allow the host 112 to learn more information about tests from the electronic device, such as what tests and how many tests the electronic devices are capable of performing and/or descriptors of the tests.

The controller 102 can receive a second command from the host 112 via the host interface. The host 112 can use the second command to select and configure at least one of the quantity of tests for the electronic device. The second command can include selections of test descriptors for each test to be configured. The controller 102 can configure at least one of the quantity of tests according to the second command. As used herein, the controller 102 configuring the test is analogous to the controller 102 causing the electronic device to configure the test. As an alternative, test configurations may be included as input parameters of the start maintenance command.

The controller 102 can receive a start maintenance command from the host 112 via the host interface. In response, the controller 102 can cause the configured test to be run on the electronic device. The controller 102 can receive signals indicative of test execution instructions via the host interface and transmit signals indicative of the test execution instructions via the electronic device interface. The controller 102 can advantageously allow the host 112 to control testing by the electronic devices although the host 112 does not have direct control over the memory device 116 or PMIC 119 as it would in some previous approaches including system memory, such as DRAM on a host system (e.g., motherboard).

The controller 102 can receive a get test results command from the host 112. In some embodiments, the get test results command can be a get log command. In response, the controller 102 can query the electronic device and receive signals indicative of results of any tests run by the electronic device. The controller 102 can transmit signals indicative of the results of the media tests via the host interface. The controller 102 can thereby allow for results reporting from the electronic device to the host 112. The controller 102 can establish mutual authentication between the host 112 and the electronic device as described in more detail with respect to FIG. 7. In some embodiments, the controller 102 manage the test run on the electronic device by sending commands to the electronic device, detect errors in device responses, and generate test results.

Figure 2:
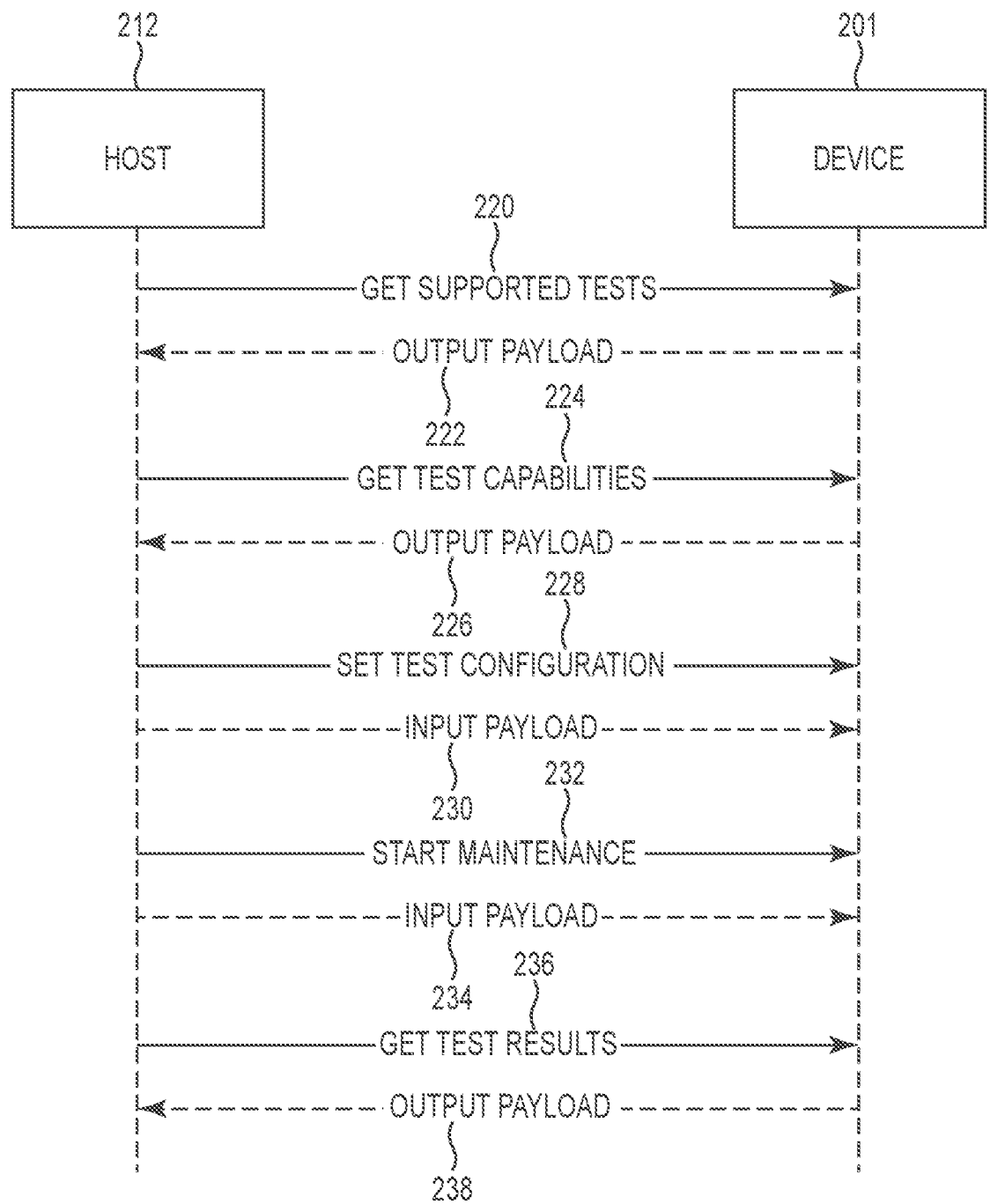
FIG. 2 is a signaling diagram between a host and an electronic device for host controlled electronic device testing in accordance with a number of embodiments of the present disclosure.

FIG. 2 is a signaling diagram between a host 212 and an electronic device 201 (not to the exclusion of other electronic devices, such as memory devices or PMICs) for host controlled electronic device testing in accordance with a number of embodiments of the present disclosure. Although not specifically illustrated in FIG. 2, in some embodiments the signals between the host 212 and the electronic device 201 pass through and can be translated or otherwise modified by a controller (e.g., the controller 102 illustrated in FIG. 1). In addition to any translation, the controller can make other physical and/or protocol changes to the signaling necessary to communicate between the host and the memory, such as accounting for different physical interfaces (e.g., pins), voltages, currents, timing, etc. The signaling diagram can represent a method for host controlled electronic device testing, although not every signal illustrated in required to perform the method in each embodiment.

The host 212 can transmit signals indicative of a get supported tests command as illustrated at 220. The host 212 can use the get supported tests command in order to learn features that are supported by the electronic device 201. For example, the host 212 can use the get supported tests command when the host 212 is initially coupled to the electronic device 201 or when new electronic devices are added. The electronic device 201 can store indications of such features. As illustrated at 222 ("output payload"), in response to the get supported tests command, the electronic device 201 can transmit signals indicative of those features.

As illustrated at 224, the host 212 can transmit signals indicative of a first command in order to discover tests supported by the electronic device 201. Examples of the first command include a get test capabilities command and a get features command, among others. In some embodiments, a controller can receive the signals indicative of the first command and transmit corresponding signals indicative of the first command to the electronic device 201. In this context, "corresponding signals" refers to signals that have been appropriately translated, provided in accordance with a desired protocol, etc. Although not specifically illustrated, in some embodiments, the supported tests and test capabilities can be queried and received as part of a single request and response between the host 212 and the electronic device 201. In some embodiments, the single request and response can yield a same log that provides a list of the supported tests and capabilities for each test.

The electronic device 201 can store an indication of how many tests the electronic device supports, and descriptors of those tests. As illustrated at 226 ("output payload"), in response to the first command, the electronic device 201 can transmit signals indicative of a quantity of tests supported by the electronic device 201 and a corresponding test descriptor for each test. The response to the first command is described in more detail with respect to FIG. 3. The controller can transmit corresponding signals indicative of the identifiers to the host 212. The host 212 can thereby discover test descriptors of the electronic device via the first command.

As illustrated at 228, the host 212 can transmit signals indicative of a second command. Examples of the second command include a set test configuration command and a set features command, among others. The second command can include a selection of at least one test supported by the electronic device 201, first configuration information applicable to all selected tests, and respective second configuration information for each selected test. The first configuration information can include an output log configuration selected from one of the test descriptors, an indication of a quantity of iterations for the selected tests, and/or other information as described in more detail with respect to FIG. 5A. The second configuration information can include a selection of a test identifier and/or a test pattern from one of the test descriptors, among other information as described in more detail with respect to FIG. 5B. The second command is described in more detail with respect to FIG. 3. The controller can transmit corresponding signals indicative of the second command to the electronic device 201. The controller can thereby configure a particular test on the electronic device 201 in response to the second command from the host 212. As illustrated at 230 ("input payload"), the host 212 can transmit signals indicative of the desired test configurations.

As illustrated at 232, the host 212 can transmit signals indicative of a start maintenance command. In some embodiments, the signals indicative of the start maintenance command can also be indicative of a maintenance operation class, maintenance operation sub-class and/or an identifier of one or more tests to be run. The controller can run at least one test on the media of the electronic device 201 in response to the start maintenance command from the host 212. As illustrated at 234 ("input payload"), the host 212 can transmit signals indicative of the desired test configurations (e.g., if a separate set test configurations command 228 is not used).

As illustrated at 236, the host 212 can transmit signals indicative of a get test results command. The get test results command can be a get log command. The controller can transmit corresponding signals to the electronic device 201. As illustrated at 238 ("output payload"), the electronic device 201 can transmit signals indicative of the results of the media test (e.g., the configured output log) in response to the get test results command from the host 212. The controller can transmit corresponding signals to the host 212. Although not specifically illustrated in FIG. 2, the controller can facilitate mutual authentication between the host 212 and the electronic device 201.

Figure 3:
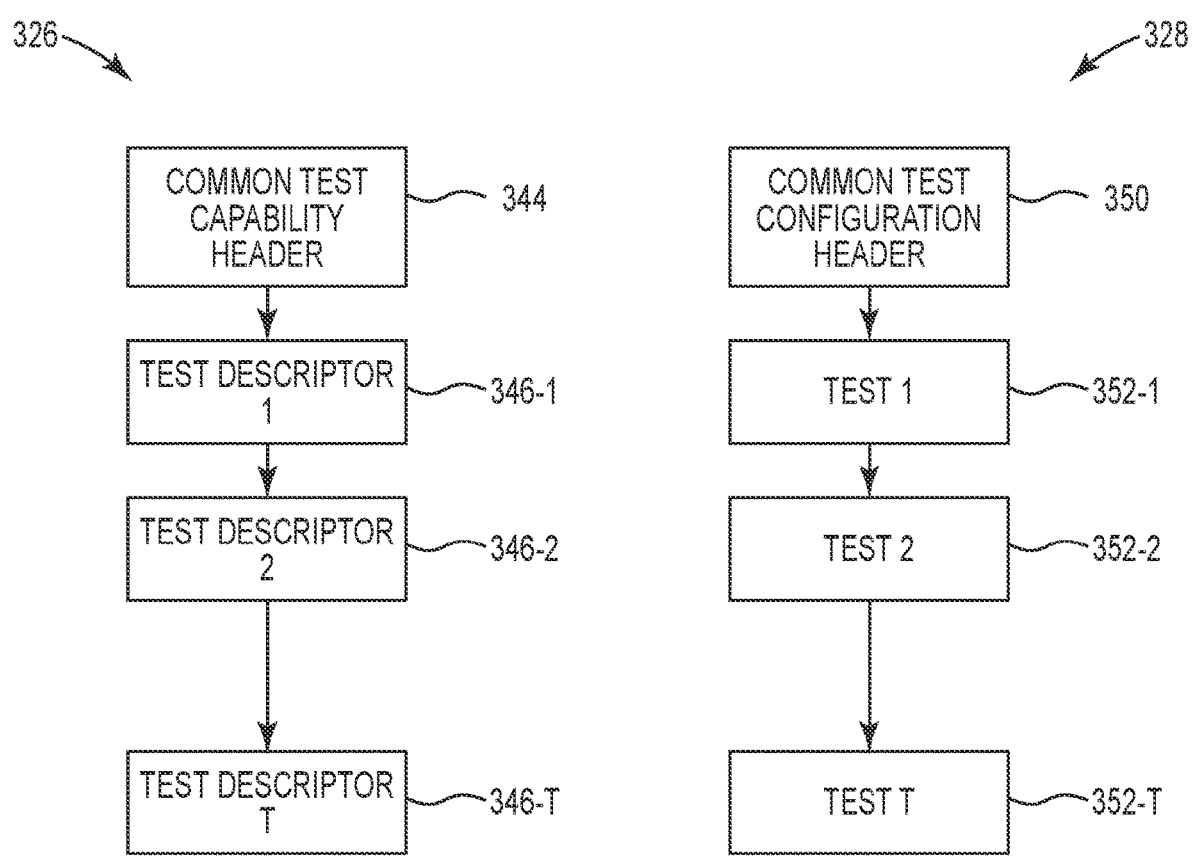
FIG. 3 is a block diagram illustrating a response to a first command and a second command in accordance with a number of embodiments of the present disclosure.

FIG. 3 is a block diagram illustrating a response 326 to a first command and a second command 328 in accordance with a number of embodiments of the present disclosure. The response 326 to the first command can include a common test capability header 344, and various test descriptors 346-1, 346-2, . . . , 346-T for the tests supported by the electronic device. Each supported test has a corresponding descriptor 346. The term "common" in this context means that the corresponding information is shared between different tests. For example, the response 326 to the first command may include three test descriptors 346 and one common test capability header 344 that applies to each of the three test descriptors. The electronic device can be configured to transmit signals indicative of the quantity of supported tests in the common test capability header 344. The common test capability header 344 is described in more detail with respect to FIG. 4A. The test descriptors are described in more detail with respect to FIG. 4B.

The second command 328 can include a common test configuration header 350 corresponding to the common test capability header 344 of the response 326 to the first command. The common test configuration header 350 is also referred to herein as "first configuration information." The common test configuration header 350 can be used by the electronic device to configure all selected tests associated with the second command. The second command 328 can include various test configuration elements 352-1, 352-2, . . . , 352-T. Each test configuration element 352 is specific to a particular test and corresponds to the respective test descriptor 346 for that test. The electronic device can use a test configuration element 352 to configure a particular selected test associated with the second command. The various test configuration elements 352 are also referred to herein as "second configuration information." The common test configuration header 350 is described in more detail with respect to FIG. 5A. The test configuration element 352 are described in more detail with respect to FIG. 5B.

The tables illustrated in FIGS. 4A-6B can include a byte offset column and length (in bytes) with example offsets and lengths for each entry. Embodiments are not limited to any particular byte offset or length.

FIG. 4A is a table illustrating a common test capability header 444 of a response to a first command in accordance with a number of embodiments of the present disclosure. The common test capability header 444 can be used in response to first commands associated with test capability discovery as well as other first commands. The common test capability header 444 can include various descriptions, such as a maximum maintenance operation latency supported by the electronic device, operation capabilities of the electronic device, operation modes of the electronic device, maintenance operation classes of the electronic device, and maintenance operation subclasses of the electronic device. The maximum latency field, operation capability field, and operation mode field can be defined for maintenance operations with specific values, or set to null for media tests. The common test capability header 444 is specific to responses to first commands associated with test capability discovery. The field can include a definition of the quantity of tests (how many tests) supported by the electronic device.

FIG. 4B is a table illustrating a test descriptor 446 of a response to a first command in accordance with a number of embodiments of the present disclosure. Each test supported by the electronic device can have a respective test descriptor 446. The test descriptor 446 can include various fields such as a test identifier, algorithm, execution time, flags, supported patterns, PRBS length, output mode, and error log size. The test identifier can be a universally unique identifier (UUID) for the test. The algorithm can be a definition of supported algorithms for the test, such as a write pattern, a write, read, and compare pattern, read pattern, a checkerboard pattern, a marching test, a MATS test, a MATS+ test, a walking 1s test, a walking 0s test, etc. The execution time can be a maximum execution time for the test per amount of memory (e.g., how long the memory device will take or is allowed to take to execute the media test), a time scale for the test, and/or a maximum operation latency for the test. Examples of flags include indications of whether address ranges are configurable, an indication of whether the test can be repeated with a complementary test data pattern, an indication of whether the test can be stopped in response to a discovered error, and an indication of an addressing mode, among others. The supported patterns can be user provided, vendor specific, PRBS, the device physical address (DPA) can be used as the pattern, etc. The PRBS length can be calculated as $2^{PRBSLength-1}$ when a PRBS pattern is supported. Supported output modes can be identified as short, long, or other. The error log size can be defined as a maximum number of errors for all configured tests.

FIG. 5A is a table illustrating a common test configuration header 550 associated with a second command in accordance with a number of embodiments of the present disclosure. Examples of parameters of the common test configuration header 550 include a maximum maintenance operation latency supported by the electronic device, operation capabilities of the electronic device, operation modes of the electronic device, maintenance operation classes of the electronic device, and maintenance operation subclasses of the electronic device.

The common test configuration header 550 corresponds to the common test capability header 444 illustrated in FIG. 4A. The common test configuration header 550 includes definitions from the host of configuration information for all of the tests selected by the host (e.g., the configuration information in the common test configuration header 550 is not specific to any one test). Examples of the configuration information include a quantity of iterations (how many iterations) of the test should be run, a maximum execution time for the test, a device estimated execution time, a start address and length (e.g., a starting device physical address and range of addresses to be tested), a quantity of tests (e.g., how many tests the hosts selects to be run), and an output log configuration. The maximum execution time can also define a maximum operation latency. The device estimated execution time can be a field that is written to by the electronic device based on the remaining parameters defined by the host (e.g., type of tests, how many, how many iterations, etc.). The output log configuration can include selections from the host of a short output log format or a long output log format and/or complete error reporting (e.g., all errors), single error reporting, or a threshold quantity of errors to be reported by the electronic device. The electronic device can transmit signals indicative of results of a test as an output log configured according to the common test configuration header 550 in response to a get test results command from the host.

FIG. 5B is a table illustrating a test configuration 552 associated with a second command in accordance with a number of embodiments of the present disclosure. The test configuration 552 corresponds to the test descriptor 446 illustrated in FIG. 4B. The host can use the test descriptor 446 to configure elements of the test to be run and report those selections in a respective test configuration 552 of a second command for each test to be run. The configuration elements of FIG. 5B correspond to the descriptors of FIG. 4B. For example, the host can select a test identifier, set flags described by the electronic device, select a test pattern supported by the electronic device, provide a pattern value, etc.

FIG. 6A is a table illustrating a short output log 660 in accordance with a number of embodiments of the present disclosure. The short output log of test results from the electronic device to the host can include an indication of a quantity of tests executed, identifiers of any tests executed, a start time of any test executed, and end time of any test executed, and status information. The status information can include indications of a successful or failed test, an indication of whether the test was aborted and if so, whether it was aborted by the host or electronic device, an indication of whether the test exceeded the configured maximum execution time, and an error log overflow.

FIG. 6B is a table illustrating additional output log information 662 for a long output log in accordance with a number of embodiments of the present disclosure. If a long output log is selected by a host, the information 662 illustrated in FIG. 6B can be included in the output log provided by the electronic device in addition to the short output log 660 illustrated in FIG. 6A as part of the test results. The information 662 can include, for example, a capacity of the electronic device that was tested, an uncorrectable error count, a correctable error count, location information where the errors occurred, validity flags for the location information (e.g., whether the particular location field is valid), and/or a correction mask. Examples of the location information include physical addresses, channel number, rank, nibble mask, bank group, bank, row, and column. The correction mask can identify the bits in error within a nibble.

Figure 7:
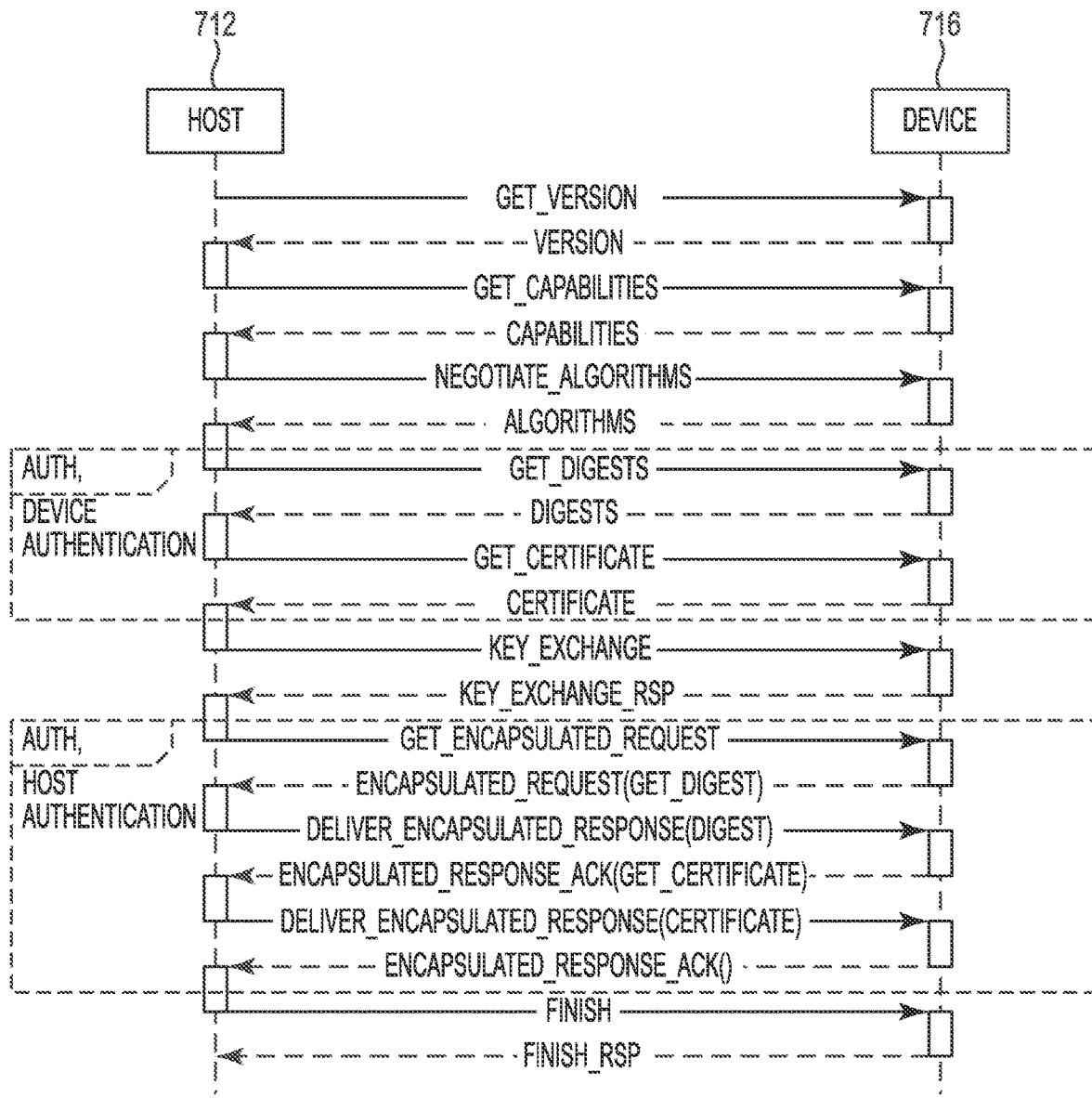
FIG. 7 is a signaling diagram between a host and an electronic device for mutual authentication between the host and the electronic device in accordance with a number of embodiments of the present disclosure.

FIG. 7 is a signaling diagram between a host and an electronic device (e.g., a memory device 201 in this example, not to the exclusion of other electronic devices, such as PMICs) for mutual authentication between the host 712 and the electronic device in accordance with a number of embodiments of the present disclosure. In some embodiments, a mutual authentication process between the host 712 and memory device 716 (such as that illustrated in FIG. 7) can be performed prior to the host controlling electronic device testing as described herein. Although not specifically illustrated in FIG. 7, the communications between the host 712 and the memory device 716 pass through and can be translated or otherwise modified by a controller (e.g., the controller 102 illustrated in FIG. 1). In addition to any translation, the controller can make other physical and/or protocol changes to the signaling necessary to communicate between the host and the memory, such as accounting for different physical interfaces (e.g., pins), voltages, currents, timing, etc. The controller can be configured to establish a security protocol and data model (SPDM) session for mutual authentication between the host 712 coupled to the host interface and the memory device 716 coupled to the memory interface to enable the host to issue test execution instructions to the memory device via the controller.

The host 712 can transmit signals indicative of a get version command to learn which version of a security protocol the memory device 716 is capable of supporting. In response, the memory device 716 can transmit signals indicative of the supported version.

The host 712 can transmit signals indicative of a get capabilities command to learn which specific capabilities the memory device 716 has within the defined version. In response, the memory device 716 can transmit signals indicative of its security capabilities.

The host 712 can transmit signals indicative of negotiating which security algorithms will be used by the memory device 716. In response, the memory device 716 can transmit signals indicative of the security algorithms to be used.

The memory device 716 can be authenticated via an exchange of digests and certificates. The host 712 can transmit signals indicative of a get digests command to learn which digests are used by the memory device 716. In response, the memory device 716 can transmit signals indicative of the digests to be used. The host 712 can transmit signals indicative of a get certificate command to learn which security certificate the memory device 716 possesses. In response, the memory device 716 can transmit signals indicative of its security certificate.

The host 712 can transmit signals indicative of a key exchange request for the memory device 716. In response, the memory device 716 can transmit signals indicative of its security key to be used.

The host 712 can be authenticated via an exchange of encapsulated digests and certificates. The host 712 can transmit signals indicative of a request for encapsulated communication. In response, the memory device 716 can transmit signals indicative of an encapsulated get digest command. In response, the host 712 can transmit signals indicative of an encapsulated digest to be used for the host authentication. The memory device 716 can transmit signals indicative of an encapsulated get certificate command to learn which security certificate the host 712 possesses. In response, the host can transmit signals indicative of an encapsulated security certificate used by the host 712. In response, the memory device 716 can transmit signals indicative of an encapsulated response acknowledging the host authentication.

The host 712 can transmit signals indicative of a completing of the mutual authentication process with the memory device 716. In response, the memory device 716 can transmit signals indicative of an acknowledgement that the mutual authentication is complete. After a successful mutual authentication, the host 712 can issue test commands to the memory device 716 (via the controller) for execution.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   transmitting to a host by a controller coupled to and physically located on a first electronic device, signals indicative of a quantity of tests supported by a second electronic device and a respective test descriptor for each test in response to a first command from the host;
   wherein the second electronic device is coupled to the controller and physically located on the first electronic device; and
   wherein the quantity of tests is a number representing a total count of how many different tests the second electronic device is capable of performing and wherein the number is stored as data by the second electronic device;
   receiving from the host by the controller, signals indicative of a selection of at least one test via a second command from the host;
   configuring, by the controller, all selected tests according to first configuration information associated with the second command;
   configuring, by the controller, each selected test according to respective second configuration information associated with the second command; and
   causing, by the controller, the at least one of the quantity of tests to be run in response to a start maintenance command from the host.

2. The method of claim 1, further comprising:
   configuring an output log according to the first configuration information;
   transmitting signals indicative of results of the at least one of the quantity of tests as the configured output log from the controller to the host in response to a get test results command from the host.

3. The method of claim 2, wherein configuring the output log comprises setting a format of the output log to long or short.

4. The method of claim 2, wherein configuring the output log comprises setting single error reporting or all error reporting.

5. The method of claim 2, wherein configuring the output log comprises setting a threshold quantity of errors to be reported.

6. The method of claim 1, wherein configuring all selected tests comprises configuring a quantity of iterations according to the first configuration information.

7. The method of claim 1, wherein configuring all selected tests comprises configuring a maximum execution time according to the first configuration information.

8. The method of claim 1, wherein configuring all selected tests comprises defining a starting address to be tested and a range of addresses to be tested according to the first configuration information.

9. The method of claim 1, wherein configuring each selected test comprises setting a test pattern according to the respective second configuration information.

10. The method of claim 1, further comprising mutually authenticating the second electronic device and the host via a security protocol and data model (SPDM) standard.

11. An apparatus, comprising a first electronic device:
a host interface;
an electronic device interface;
a second electronic device physically located on the first electronic device and coupled to the electronic device interface; and
a controller physically located on the first electronic device and coupled to the host interface and the electronic device interface, wherein the controller is configured to:
in response to a first command received via the host interface, transmit signals via the host interface indicative of:
a quantity of tests supported by the second electronic device, wherein the quantity of tests is a number representing a total count of how many different tests the second electronic device is capable of performing and wherein the number is stored as data by the second electronic device; and
a corresponding test descriptor for each of the quantity of tests;
configure at least one of the quantity of tests according to a second command received via the host interface;
cause the at least one of the quantity of tests to be run in response to a start maintenance command from the host; and
transmit signals indicative of results of the at least one of the quantity of tests via the host interface in response to a get test results command from the host.

12. The apparatus of claim 11, wherein the second electronic device comprises a power management integrated circuit (PMIC).

13. The apparatus of claim 11, wherein the second electronic device comprises a memory device;
wherein the electronic device interface comprises a memory interface;
wherein the controller is configured to operate the host interface via a compute express link (CXL) protocol and to operate the memory interface via a double data rate (DDR) protocol.

14. The apparatus of claim 13, wherein the controller is configured to receive signals indicative of the test descriptors and the quantity of tests via the memory interface; and
cause the at least one of the quantity of tests to be run on the memory device coupled to the memory interface.

15. A system, comprising:
a host; and
an electronic device coupled to the host, wherein the electronic device is configured to transmit signals indicative of:
a quantity of tests supported by the electronic device, wherein the quantity of tests is a number representing a total count of how many different tests the electronic device is capable of performing, wherein the number is stored as data by the electronic device; and
a corresponding test descriptor for each of the quantity of tests, in response to a first command received from the host;
wherein the host is configured to transmit signals to the electronic device indicative of:
a selection of at least one of the quantity of tests;
first configuration information applicable to all selected tests; and
respective second configuration information for each selected test, in a second command; and
wherein the electronic device is configured to run the selected at least one of the quantity of tests in response to a start maintenance command from the host.

16. The system of claim 15, wherein the host is configured to:
transmit the signals indicative of the first configuration information in a common test configuration header of the second command; and
transmit the signals indicative of the respective second configuration information in respective test configuration elements of the second command.

17. The system of claim 15, wherein the first configuration information includes an output log configuration selected from one of the test descriptors.

18. The system of claim 17, wherein the electronic device is configured to transmit signals indicative of results, comprising the output log, of the selected at least one of the quantity of tests to the host in response to a get test results command from the host.

19. The system of claim 15, wherein the first configuration information includes an indication of a quantity of iterations for the selected tests.

20. The system of claim 19, wherein the second configuration information includes a selection of a test identifier and a test pattern from one of the test descriptors.

21. The system of claim 15, wherein the electronic device is configured to transmit the signals indicative of the quantity of tests supported by the electronic device in a common test capability header of the response to the first command.

* * * * *